US006643032B1

(12) United States Patent
Crean et al.

(10) Patent No.: US 6,643,032 B1
(45) Date of Patent: Nov. 4, 2003

(54) MARKING ENGINE AND METHOD TO OPTIMIZE TONE LEVELS IN A DIGITAL OUTPUT SYSTEM

(75) Inventors: Peter A. Crean, Penfield, NY (US); Martin S. Maltz, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/221,239

(22) Filed: Dec. 28, 1998

(51) Int. Cl.[7] .............................................. H04N 1/405
(52) U.S. Cl. ..................... 358/3.06; 358/3.16; 358/3.17
(58) Field of Search ........................ 358/1.9, 298, 455, 358/456, 458, 519, 534, 535, 536, 3.01, 3.06, 3.13, 3.16, 3.17

(56) References Cited

U.S. PATENT DOCUMENTS

| | | |
|---|---|---|
| 4,185,304 A | 1/1980 | Holladay |
| 5,287,195 A | 2/1994 | Biumer |
| 5,390,029 A | 2/1995 | Williams et al. |
| 5,615,021 A * | 3/1997 | Lin .............................. 358/3.1 |
| 5,729,663 A | 3/1998 | Lin et al. |
| 5,818,604 A * | 10/1998 | Delabastita et al. ........ 358/298 |
| 6,185,005 B1 * | 2/2001 | Yoo ............................ 358/1.9 |

* cited by examiner

Primary Examiner—Thomas D. Lee
(74) Attorney, Agent, or Firm—Fay, Sharpe, Fagan, Minnich & McKee, LLP

(57) ABSTRACT

A halftone cell is composed of a plurality of pixel groupings predefined to correspond to optimal tone level gradations. Selected output pixel groupings vary in number, and in shape of subpixels used from other pixel groupings, in order that successive input levels correspond to successive halftone cells defining substantially equal changes in a measured darkness value. Tone level gradations are optimized by purposeful correlation of input levels to output levels, especially where the number of output levels exceeds the number of input levels. During optimization, a calibration sample is produced by the image output device and calibration elements are empirically measured. Darkness change between successive levels is calculated and compared. Where the percentage of darkness change exceeds a desired amount, additional calibration elements are produced until the change calculated between successive levels is substantially the same. Successive input levels are associated with successive output levels such that a change between any adjacent input levels produces a change in darkness in the desired amount. The correlation is stored in a look up table for use during operation of the image output device.

10 Claims, 5 Drawing Sheets

| 62 | 58 | 51 | 36 | 34 | 24 | 15 | 12 | 20 | 29 | 33 | 35 | 38 | 47 | 57 | 61 |
|---|---|---|---|---|---|---|---|---|---|---|---|---|---|---|---|
| 54 | 50 | 27 | 21 | 4 | 1 | 2 | 3 | 9 | 14 | 17 | 25 | 31 | 39 | 48 | 60 |
| 59 | 52 | 28 | 18 | 8 | 5 | 6 | 7 | 10 | 11 | 22 | 26 | 32 | 40 | 41 | 53 |
| 63 | 55 | 49 | 44 | 43 | 19 | 13 | 16 | 23 | 30 | 37 | 42 | 45 | 46 | 56 | 64 |

32

| INPUT LEVEL | SUB-PIXELS | DARKNESS | Δ |
|---|---|---|---|
| 0 | 0 | .00 | - |
| 1 | 4 | .02 | .02 |
| 2 | 8 | .04 | .02 |
| 3 | 12 | .08 | .04 |
| 4 | 16 | .22 | .14 |
| 5 | 20 | .40 | .18 |
| 6 | 24 | .48 | .08 |
| 7 | 28 | .51 | .03 |
| 8 | 32 | .74 | .23 |
| 9 | 36 | .86 | .12 |
| 10 | 40 | .92 | .06 |
| 11 | 44 | .95 | .03 |
| 12 | 48 | .97 | .02 |
| 13 | 52 | .99 | .02 |
| 14 | 56 | 1.00 | .01 |
| 15 | 60 | 1.00 | .00 |
| - | 64 | 1.00 | .00 |

50 — SHOWING INPUT LEVEL CORRELATION
WITH SPECIFIC NUMBERS OF SUBPIXELS

| INPUT LEVEL | # OF SUBPIXELS | MEASURED DARKNESS | Δ |
|---|---|---|---|
| 0 | 0 | .00 | - |
| 1 | 12 | .07 | .07 |
| 2 | 15 | .13 | .06 |
| 3 | 16 | .19 | .06 |
| 4 | 17 | .25 | .06 |
| 5 | 18 | .32 | .07 |
| 6 | 20 | .38 | .06 |
| 7 | 22 | .44 | .06 |
| 8 | 30 | .50 | .06 |
| 9 | 33 | .57 | .07 |
| 10 | 34 | .63 | .06 |
| 11 | 35 | .69 | .06 |
| 12 | 36 | .75 | .06 |
| 13 | 38 | .82 | .07 |
| 14 | 42 | .88 | .06 |
| 15 | 46 | .94 | .06 |

MARKING ENGINE AND METHOD TO OPTIMIZE TONE LEVELS IN A DIGITAL OUTPUT SYSTEM

BACKGROUND OF THE INVENTION

The invention pertains to the art of image processing and, more particularly, to the halftoning arts. It finds particular application in conjunction with high addressable printing devices, halftone dot design and procedures for loading a halftone generator. Accordingly, it will be described with reference thereto.

The following description includes references to 'pixels.' A distinction between 'input pixels' and 'output pixels' is necessary at the outset for clarity. A pixel, or picture element, is generally understood to be the smallest bit of an image that a particular device can reproduce.

Image input devices, however, such as PostScript interpreters, scanners and video memory elements provide pixels or image information as an 8 bit signal per color. These 8 bit pixels typically are capable of uniquely identifying up to 256 distinct levels.

Image output devices, on the other hand, such as digital color printers, monochrome facsimile devices and the like, produce binary pixels. That is, the image output pixel is typically either a mark or lack of a mark. Groupings of these binary pixels, called 'halftone dots,' are arranged in a predetermined pattern within a digital halftone cell. In order to create a variety of output levels, groupings of output pixels are output at various frequencies. The lower the number of output pixels per unit area, the lighter the tone. The higher number of output pixels per unit area, the darker the tone.

Presently, various digital image-processing techniques are known for manipulating static images for output. Existing digital color printers, such as the Xerox® 5775 printer use digital halftone cells with about 120 levels per color. These levels are approximately uniformly distributed in reflectance space. The 8-bit input signal used to control each of these 120 output levels is assumed to be linear in reflectance. During printer calibration, a look up table is developed to map these 256 input levels into the appropriate 120 output levels within the printer space, losing a few levels in the process. This loss is not significant because the remaining input levels (about 200) are mapped onto the 120 actual printer halftone levels. Given the printer noise, 120 levels are sufficient for a medium quality output.

For higher quality output, over 150 distinguishable output levels are needed. In some printing technologies, several of the colors have a steep gamma, reaching 10% reflectance (i.e. 90% darkness) with only 50% of the input bits turned on. Even if the digital halftone cell were designed with 256 output levels, 90% of the incoming levels from the source (e.g. a scanner or Raster Image Processor) would map into the first 128 levels. Indeed, empirical testing has shown that these steep gammas combined with vagaries of human eye perception and printer rendition may not be as successful in producing the desired perception of a gradual shading change over the range of the output device. In particular, certain incremental changes in the halftone dot patterns may not be perceived as having any shading change consequence whatever. Hence, an assignment of one of the limited number of control signals (i.e. input signals) to produce an imperceptible change in darkness is effectively a waste of the control signal value.

This waste is the problem addressed and resolved by the subject invention; i.e., implementation of a system wherein all available control signal values each correspond to meaningful, distinctive halftone dot patterns. The present invention contemplates a new, efficient marking engine and method to optimize tone levels in a digital output system which overcomes the above referenced problems and others.

BRIEF SUMMARY OF THE INVENTION

In accordance with the present invention, a halftone cell configuration of a plurality of output pixels has optimal tone level gradations. The halftone cell comprises output pixel patterns corresponding to the tone level gradations where selected patterns vary in form and number of output pixels from other patterns.

In accordance with another aspect of the present invention, each of the output pixel patterns corresponds to a substantially equal change in a measured darkness value.

In accordance with another aspect of the present invention, the output pixel patterns comprise a predetermined number of subpixels comprising a fractional portion of each pixel.

In accordance with another embodiment of the present invention, a method for optimizing tone level gradations in an image output device is provided. The method includes the steps of creating a tone reproduction curve defining a relationship between the number of output levels and a level of darkness. The method also includes correlating each one of the number of input levels to a corresponding one of the number of output levels based on a desired percentage change in the level of darkness.

In accordance with another aspect of the present invention, the tone reproduction curve is created by producing a calibration sample of individually measurable calibration elements representative of a plurality of the output levels. The level of darkness associated with the calibration elements is then empirically measured and plotted relative to the output levels.

In accordance with another aspect of the present invention, the correlation comprises determining a percentage change in the level of darkness between successive input levels. Where the determined percentage is substantially less than the desired percentage change, one of the input levels is unassigned from one of the successive input levels. When the determined change is substantially greater than the desired change, additional calibration elements are produced and measured until the determined change is substantially equal to the desired change.

In accordance with yet another aspect of the present invention, the halftone cell comprises outputting a plurality of neighboring halftone cells configured as a supercell.

In accordance with another embodiment of the present invention, an image output apparatus receives one of a predefined set of input levels and outputs one of a set of predefined halftone cell configurations of subpixels; such that each one of the set of input levels produces an appreciable change in darkness. The apparatus comprises a look up table preprogrammed such that one of the set of input levels corresponds to a number of subpixels, and another of the input levels corresponds to a different number of subpixels. A halftone pattern generator is included for arranging the number of subpixels into the predefined pattern.

One benefit obtained by use of the present invention is that the efficient selection of levels makes more levels available for use in steep areas of an unmodified tone reproduction curve (high gamma). This in turn reduces the possibility of visible banding.

Other benefits and advantages will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings which form a part hereof and wherein.

DETAILED DESCRIPTION OF THE PREFERRED EMBODIMENT

Figure 1:
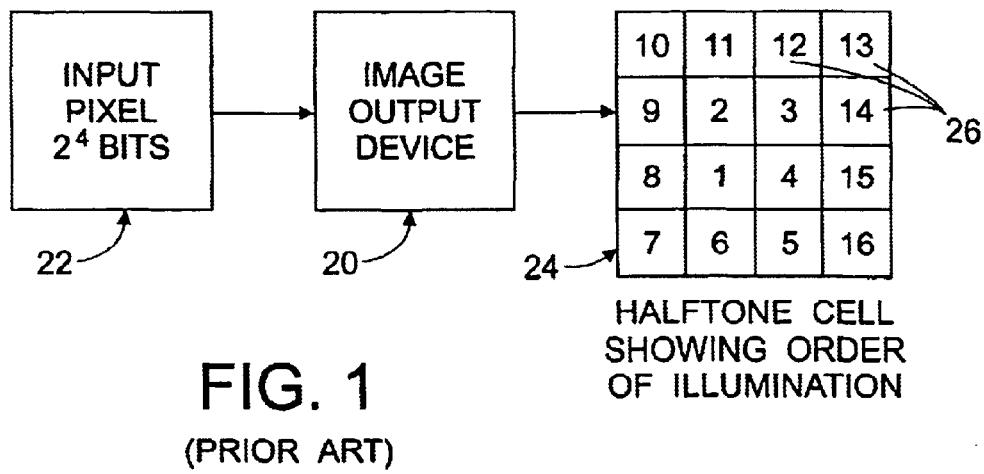
FIG. 1 is a simplified graphic depiction of an input pixel conversion into an output halftone cell.

Turning now to the drawings, wherein the showings are for purposes of illustrating the preferred embodiments of the invention, and not for purposes of limiting same, an image output device 20 receives an input pixel 22. In the illustrated example, the input pixel 22 is capable of producing 16 distinguishable input levels. The image output device comprises a conversion mechanism and produces the halftone cell 24. The halftone cell 24 is composed of 16 binary output pixels 26. These output pixels 26 are typically understood to define the number of output levels a particular imaging device can produce (in this case, 16). As such, conventional image output devices would likely assign each discrete input level to a particular output pixel. That is, the output halftone cell 24 would progressively darken with the illumination of each successive output pixel in response to progressively greater input levels. The progressive illumination of output pixels by a raster output scanner, for example, might occur in the order listed by the numbers within the cells (with "1" illuminating first).

Figure 2:
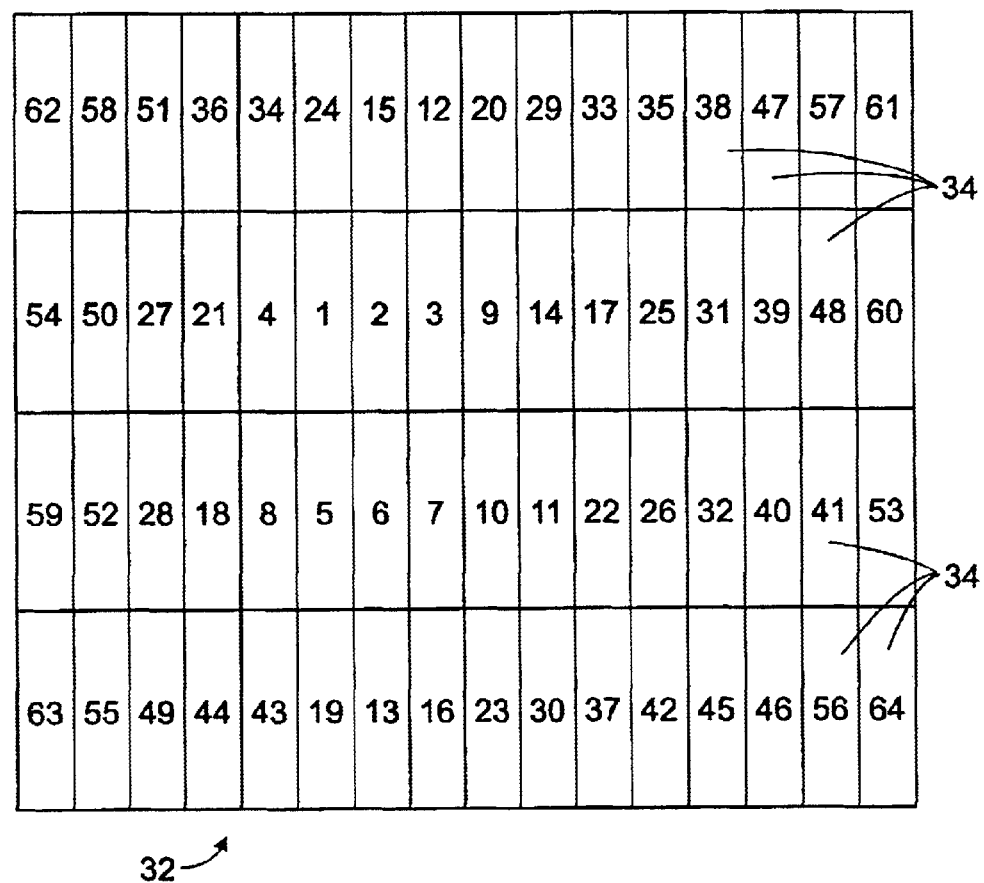
FIG. 2 is a graphic depiction of a high addressable halftone cell.

Referring now to FIG. 2, it is known in the art that a high addressable raster output scanner (not shown) can produce a halftone cell 32 having each output pixel divided into a plurality of subpixels 34. As is evident, the halftone cell 32 now is capable of producing 64 levels recognizing that each subpixel 34 may be illuminated individually. Thus, there are fewer control signals or input levels (16 in the present example) than output levels or subpixels (64 in the present example). The relative scarcity of input levels necessitates allocating blocks of subpixels to each input level. Customarily, this allocation is made by uniformly mapping the input levels over the number of output levels. That is, every input level equates to four subpixels in the present example.

Figures 3, 4:
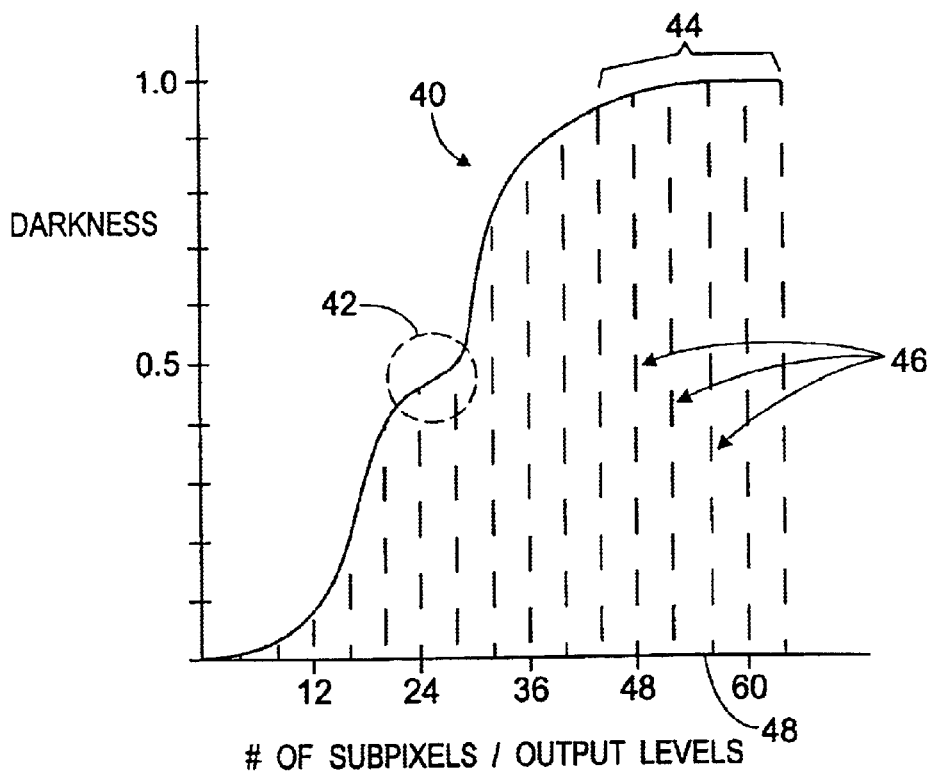
FIG. 3 is an exemplary depiction of a typical tone reproduction curve for a non-linear output device.
FIG. 4 is a table showing the darkness values for input levels uniformly spaced over the output levels.

Now referring to FIG. 3, a typical tone reproduction curve (TRC) 40 is produced by plotting a curve of the darkness or intensity effected by the range of subpixels renderable by an image output device. The TRC 40 is typical in that it is not linear. Most image output devices are non-linear; that is, an increased number of subpixels does not always yield a corresponding increase in observed darkness. In other words, the TRC 40 has "miscontinuities" or flat spots 42, 44.

As noted above, typical image output processing evenly applies the number of input levels (16 in the simplified example of TABLE 1) onto the number of output levels or renderable subpixels (64 in our example). This even distribution is shown by dashed lines 46 onto the "# of subpixels/ output levels" axis 48. In other words, the even assignment procedure entails successively equating groups of 4 subpixels to each input level yielding the halftone cell 24 (from FIG. 1) to produce the lightest gray shade to all black.

Unfortunately, as the table in FIG. 4 reveals, the observed or measured darkness change between successive input levels is not uniform. For example, moving from 24 to 28 subpixels (or between input level 6 and input level 7) produces a 3 percent change in measured darkness. On the other hand, moving from 28 to 32 subpixels (or between input level 7 and input level 8) produces a 23 percent change in measured darkness. Such drastic changes in observed darkness result in banding and other image degradations. Equally important is the lack of appreciable change in measured darkness despite illumination of several pixels worth of subpixels. Examples reside in the miscontinuites 42, 44. These areas reveal an inefficient allocation of input levels.

Figure 5:
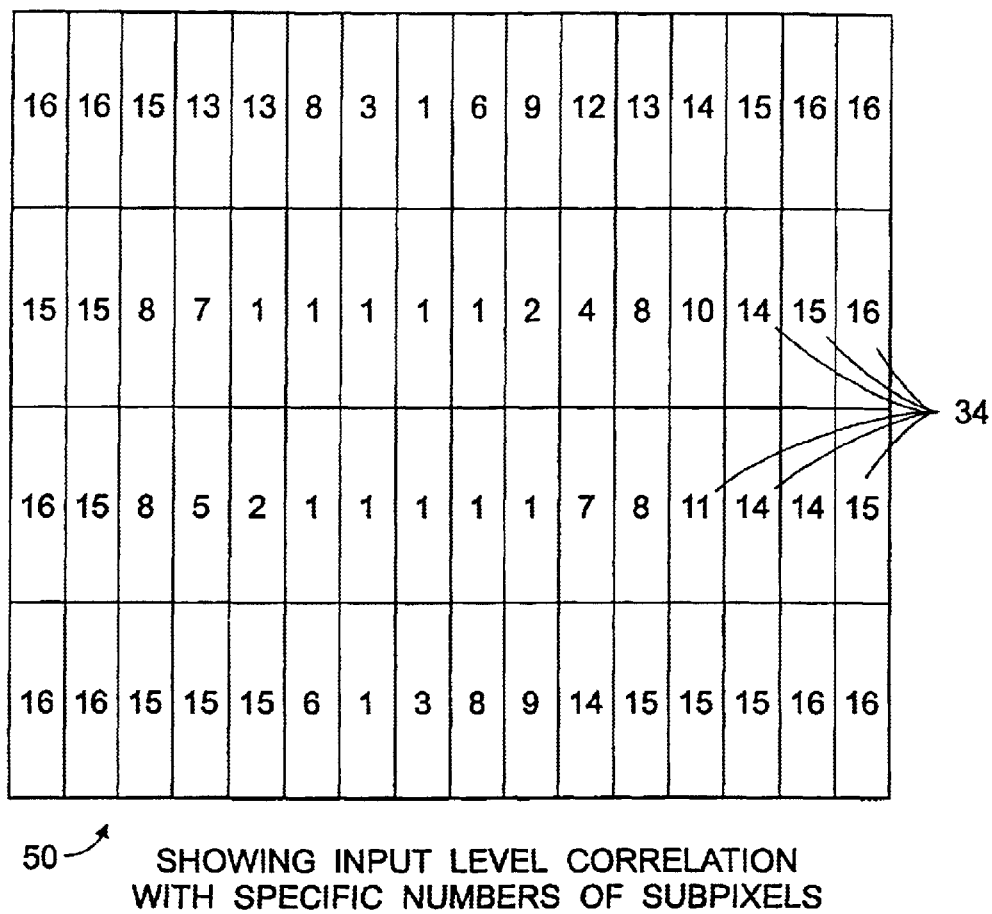
FIG. 5 is an exemplary halftone cell according to the present invention.

Referring now to FIG. 5 a halftone cell 50 having optimum output tone levels includes a plurality of subpixels 34. Numbers within each subpixel indicate a correspondence with successive input levels. In other words, subpixels containing a "1" will be illuminated upon receipt of the first input level, subpixels containing a "2" will additionally illuminate in response to the second input level, and so on. The illustrated number of output pixels are selected such that each input level corresponds to a uniform, appreciable change in measured darkness, as will be discussed below. Continued reference to FIG. 5 reveals the output pixel patterns vary in form and in number of subpixels depending on the input level received. It is to be appreciated that the example is for illustration purposes only, and that other dot growth patterns are possible.

Figures 6A, 6B:
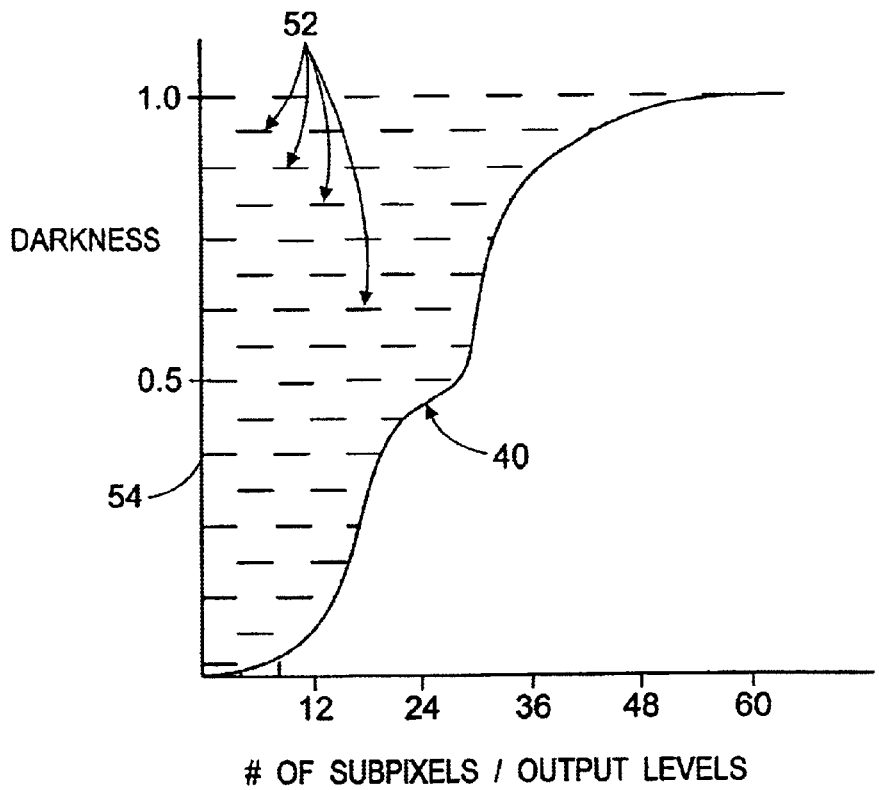
FIG. 6 is a tone reproduction curve and table showing the input level correspondence to changes in measured darkness according to the present invention.

Referring to FIG. 6A the association of input levels to numbers of subpixels begins by creating a tone reproduction curve (TRC) 40 (as shown in FIG. 3) for the particular image output device. The TRC 40 is constructed using a printed calibration sample. Preferably the calibration sample is produced by programming a printer to produce calibration elements corresponding to differing numbers of subpixels. While it may be feasible in the case of the illustrated example to produce a calibration element corresponding to every possible number of subpixels (i.e. 64 calibration elements, one for each output level), in practice typically a subset is initially produced. This subset is preferred because a 10 by 10 supercell grid, for example, can produce 400 levels (10 rows times 10 columns times 4 subpixels/pixel). Preferably, the initial calibration sample will include a uniform progression of subpixels across the possible number of input levels. The reflectivity, or inversely, darkness, of each calibration element is empirically measured and the result is plotted as is illustrated in FIGS. 3 and 4.

This uniform progression can be appreciated by referring back to FIG. 4. Column delta shows a percentage change in measured darkness between successive calibration elements. Where the change is greater than a desired percentage change, additional calibration elements are produced between the elements producing the large change. In the illustrated example the desired percentage change is 6%. Thus, additional calibration elements will be produced between 12 and 24 subpixels; and 28 and 36 subpixels. Reference to FIG. 3 shows these subpixels correspond to steep changes in darkness, where output image degradations are likely to occur. If required, additional, calibration elements can continue to be produced until actual measured change in darkness level meets the desired percentage. While the illustration used 6% as the desired change, preferably the percentage is much smaller, on the order of ½% (one-half of one percent). One skilled in the art can appreciate that to achieve ½% darkness change per input level in a system with strong dot gain, the total number of digital output levels may need to be as high as 500 to 700, achievable by use of the supercell grid described above.

It can now be explained that the above calibration is the process by which each input level is correlated to a corresponding number of output pixels, or output levels. The resulting correlation produces a uniform change in observed darkness per incremental increase in input level as is illustrated by the TRC and table shown in FIG. 6B. Referring to the TRC 40 it can be appreciated that the correlation obtained above may be achieved by mapping a uniform distribution of input levels through the inverse of the TRC function onto the available set of output levels. This is illustrated by the dashed lines 52 indicating uniformly spaced input levels over the darkness axis 54 and down to the appropriate output level.

Figure 7:
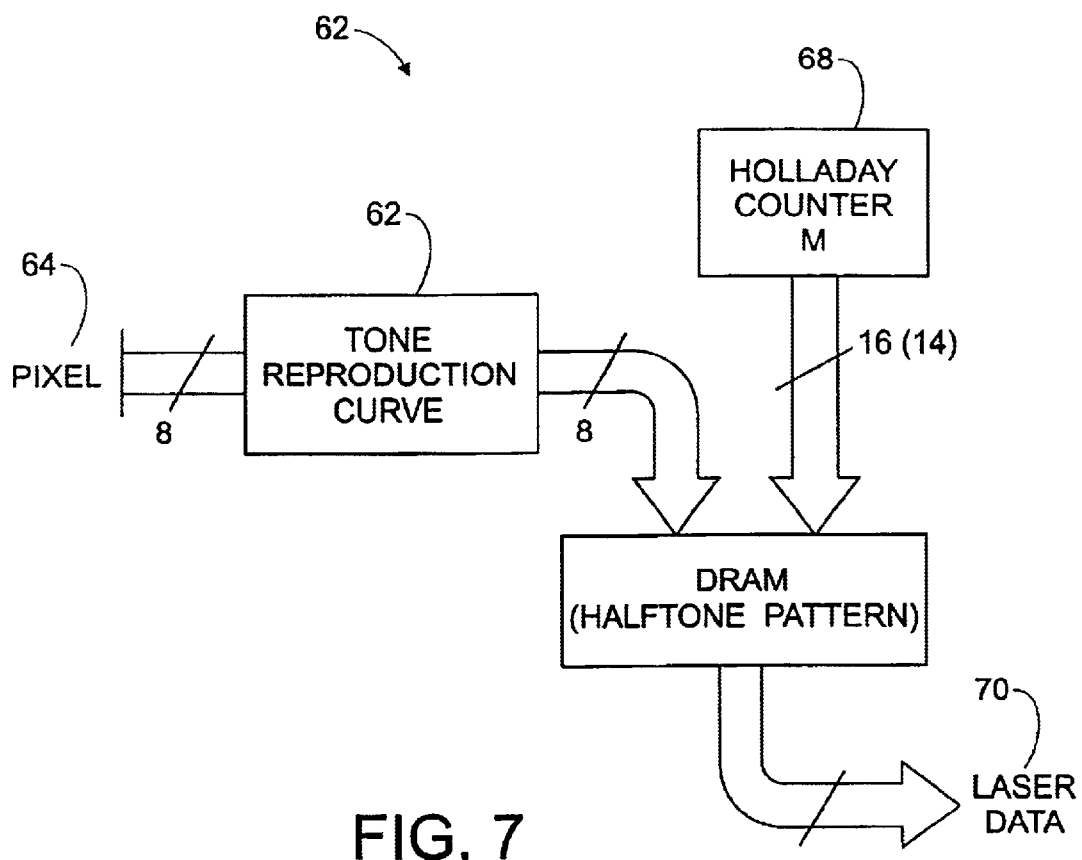
FIG. 7 is a simplified printing system suitable for practicing the present invention.

Now referring to FIG. 7, a system according to the present invention is shown designated generally as 60. Prior to use, the system 60 would be calibrated as discussed above and a halftone threshold pattern, corresponding to the one discussed in FIG. 5 for example, would be stored in the DRAM 66. In the discussion associated with FIG. 5, we considered the simplified case where we feed pixels with one of 16 levels into a halftone pattern with 64 output binary subpixels. In the more practical case shown in FIG. 7, we feed pixels with one of 256 levels (8 bits) into a halftone pattern with 400 or more output binary subpixels. The TRC 62 is used to improve the linearization of the printer, and to compensate for drift using techniques for making minor adjustments to tone range while preserving distinctiveness of most of the input levels as is well known in the state of the art. During use, preferably an 8-bit input pixel 64 arrives from a scanner or other input device. The pixel 64 passes through the memory device or TRC 62 where an output level is selected based on the input level of the pixel 64. The output tone level then passes into a memory 66 which translates the tone level into a number of subpixels and produces the pattern of subpixels based on screen frequency and the like from a Holladay counter device 68. Thus, the translated or selected subpixels are properly placed within the halftone cell. The mechanics of partial dotting is known in the art. Accordingly, out of the memory 66, is high addressable laser data 70 suitable for driving a raster output scanner and illuminating subpixels on the output medium.

Alternatively, the bus between TRC 62 and DRAM 66 can be configured to accommodate more than 8 bits. TRC 62 could then store the corrected level (8 bits) or the number of subpixels (more than 8 bits).

As one skilled in the art can now appreciate, the invention teaches a method for choosing the operative subset of halftone levels from the greater number that are possible in high resolution, multi-centered dot designs. The specific description used herein has been a hardware-based direct lookup approach where the table stores the printing binary patterns for each of the input tone levels (pixel values). An alternative implementation of the same decision process for choosing halftone levels is called a threshold approach which stores in the memory 66 for each subpixel in the halftone cell the value of input for which it switches from 0 to 1. This threshold approach follows precisely the lookup approach detailed above. In the threshold approach, the data stored in memory 66 is more compact but requires more memory bandwidth and processing logic to produce the printable data. The direct and threshold approach are differentiated by actions at a level below that covered by the present invention as is evident to those skilled in the art.

It is to be further appreciated that the present invention can be practiced by either hardware or software implementations of the halftoning process. In fact, the same data 62, 66 are produced in calibration and dot design regardless of whether the system uses hardware or software halftoning.

Although laser printers are preferred, the present invention recognizes that the method is equally efficient in any halftone output device, for example electrostatic printers and copiers, facsimile machines or computer generated plate engraving devices. Additionally, while examples have commonly recited 4-bit input devices, any multi-bit input terminal could also be linearized by the present invention which has been described with simplified examples of the preferred embodiments. Potential modifications and alterations will occur to others upon a reading and understanding of the specification. It is our intention to include all such modifications and alterations insofar as they come within the scope of the appended claims, or the equivalents thereof.

Having thus described the preferred embodiment the invention is now claimed to be:

1. A halftone cell having a plurality of consecutive graduated output levels responsive to an input intensity value of an input pixel, said halftone cell comprising:

a matrix of subpixels corresponding to the input pixel, each subpixel having a binary output including a first subpixel output level and a second subpixel output level, said matrix being divided into a plurality of distinct subsets of subpixels such that with progressively higher input intensity values of the input pixel, progressively more subsets of subpixels switch their binary output from the first subpixel output level to the second subpixel output level, each switch of one subset of subpixels corresponding to one increase in the graduated output level of the halftone cell;

wherein the subsets of subpixels are arranged so that, when progressing from a lowest to a highest input intensity value of the input pixel, the subpixels switching to the second subpixel output level form a cluster of neighboring subpixels which grows outward from a center of the matrix to a periphery of the matrix, each subset of subpixels including a number of subpixels such that said halftone cell exhibits substantially linear perceived intensity changes between consecutive graduated output levels thereof, said plurality of distinct subsets of subpixels including at least two subsets of subpixels having numbers of subpixels different from one another.

2. A method for optimizing tone level gradations in an image output device capable of receiving a number of input levels and outputting a halftone cell comprising a plurality of pixels arranged to define a number of output levels, said method comprising:

creating a tone reproduction curve defining a relationship between the number of output levels and a level of darkness, said creating including:

producing a calibration sample of individually measurable calibration elements representative of a plurality of the output levels, the calibration elements each defining a level of darkness;

empirically measuring the level of darkness of each of the calibration elements; and, plotting the measured level of darkness relative to the output levels;

correlating each one of the number of input levels to a corresponding one of the number of output levels based on a desired percentage change in the level of darkness, said correlating including:

assigning each input level to one of the measured levels of darkness;

determining a percentage change in the level of darkness between successive input levels;

where the determined percentage change is substantially less than the desired percentage change, removing the input level assignment of one of the successive input levels; and, where the determined percentage change is substantially greater than the desired percentage change, repeating the producing, measuring, plotting, assigning and determining steps between the successive input levels until the determined percentage change is substantially equal to the desired percentage change between the successive input levels; and, storing the correlation of input levels to output levels.

3. The method for optimizing tone level gradations of claim 2 where the desired percentage change between successive input levels is one-half of one percent.

4. An image output apparatus for receiving one of a predefined set of sequential input levels, and for outputting, based on the input level received, one of a set of predefined halftone cell configurations of subpixels, where each one of the set of input levels produces an appreciable change in darkness in the output halftone cell, the apparatus comprising:

a look up table preprogrammed such that for each pair of consecutive input levels, a first of the pair corresponds to a first number of subpixels, and a second of the pair corresponds to a second number of subpixels, wherein for at least two pairs a different between the first and second numbers of subpixels is not the same; and a halftone pattern generator for arranging the number of subpixels into a pattern of neighboring subpixels, said pattern starting at a substantially central location in the halftone cell and extending in multiple directions to a periphery of the halftone cell;

wherein the appreciable change in darkness is substantially uniform between consecutive input levels.

5. The image output terminal of claim 4 wherein the appreciable change in darkness is substantially one-half of one percent.

6. The image output apparatus of claim 5 further comprising a raster output scanning device.

7. The image output apparatus of claim 5 further comprising an item selected from the set of printers, copiers, and facsimile machines.

8. A method of generating a halftone output comprising:

receiving an input intensity value for an input pixel;

providing a matrix of subpixels corresponding to the input pixel, each subpixel having a separate selectable output value;

dividing the matrix into a plurality of distinct subsets each including a number of subpixels, said plurality of distinct subsets including at least two subsets having numbers of subpixels different from one another; and, selecting the subpixel output values such that in each subset all the subpixels therein have the same output value, and the number of subsets having like subpixel output values corresponds to the input intensity value of the input pixel, said selecting being carried out such that a boundary of neighboring subsets having like subpixel output values fluctuates in location between a center region of the matrix and a periphery of the matrix in accordance with the input intensity value.

9. The method of claim 8, wherein the matrix is divided such that the number and location of subpixels in each subset along with the selecting of subpixel output values results in substantially uniform visually perceivable changes in the halftone output when substantially equivalent changes in the input intensity value of the input pixel are experienced.

10. The method of claim 9, wherein the input intensity value of the input pixel corresponds to one of a plurality of defined input intensity values, and the generated halftone output corresponds to one of a plurality of defined halftone outputs, there being more of the plurality of defined halftone outputs than the plurality of defined input intensity values.

* * * * *